Jan. 16, 1940.                    G. CAPRONI                     2,187,074
                                SUBMARINE BOAT
                              Filed April 6, 1938            3 Sheets-Sheet 3
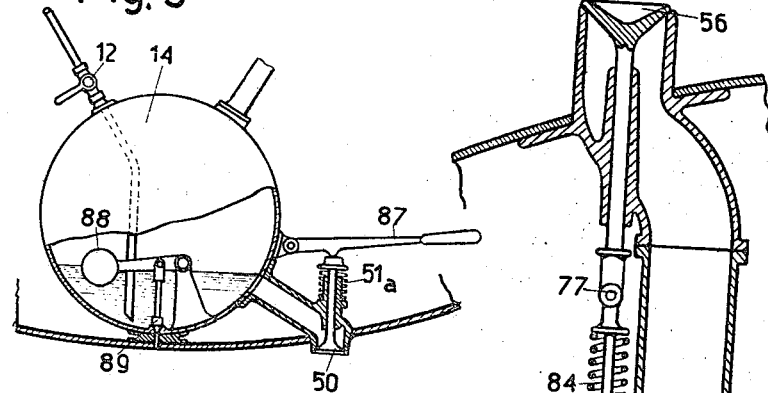
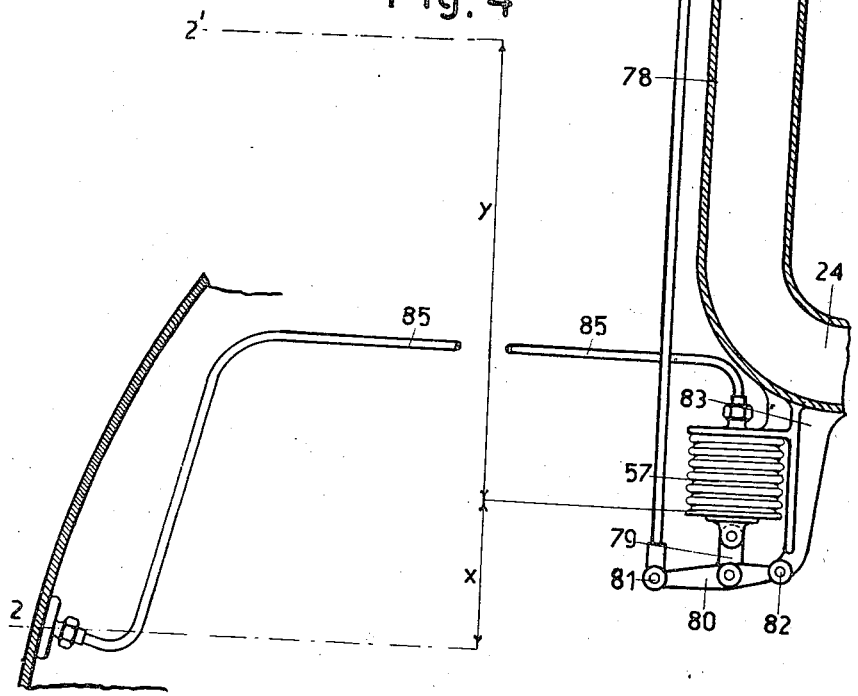

Patented Jan. 16, 1940

2,187,074

UNITED STATES PATENT OFFICE 2,187,074

SUBMARINE BOAT

Gianni Caproni, Milan, Italy

Application April 6, 1938, Serial No. 200,446
In Italy April 12, 1937

29 Claims. (Cl. 114—16)

The present invention relates to submarine boat operation and has for its object to afford an improved method and plant for the propulsion of submarines by means of internal combustion engines.

The principle is already known of substituting for the air the internal combustion engines need the burnt gases which the engine expels, after having them regenerated by the addition of fresh oxygen; and also the great desirability is known, of employing said principle in subaqueous navigation, replacing there the electric type of propulsion.

The invention consists in an integral solution of the said problem, and the realization of the said principle on board of a submarine in a manner that will be practically possible.

The method of operation permitted by the invention comprises the stages of (1) cooling the exhaust gases of the engine, (2) eliminating the condensation water, (3) subjecting the exhaust gas alternately to throttling and expansion, (4) adding oxygen in suitable proportions to the gas, (5) heating the pressure reducing source of the oxygen, (6) changing over from the supply of surrounding air to that with oxygenated exhaust gas, and vice versa, according to whether underwater travelling or surface travelling is to be performed, (7) providing suitable cooling water reserves so as to compensate for evaporation, (8) providing controlled apertures for the introduction of the surrounding air, for the discharge of the gases into the atmosphere during the surface travel, and for the discharge, at the moment wanted, of the fluid under pressure, stored in the tank which receives the condensing water.

The plant for carrying out these operations comprises at least one internal combustion engine, an oxygen reserve, means for the formation of the combustible mixture, interdependently controlled, commutating means respectively for the supply of surrounding air or of oxygenated exhaust gas, means for the cooling of the exhaust gases, means for conditioning these gases in the most suitable manner for proper mixing and for their silent discharge, means for cooling the engine in closed cycle, combined with means for compensating the losses of cooling water on account of evaporation, and controlling means for the communication with the exterior of the craft of the air intake and the exhaust port of the engine and of the pressure tank, and means mechanically connecting the various members to attain the desired results.

Now, the invention will be explained with reference to the annexed drawings, given only by way of example, and which show an embodiment of the plant utilizing an explosion engine.

Fig. 4 shows the details of the safety valves;

Fig. 5 shows a modification of the pressure tank, relating to another manner of removing the excess of gas.

Fig. 6 shows a device for the optimum utilization of the oxygen supply.

Figure 1:
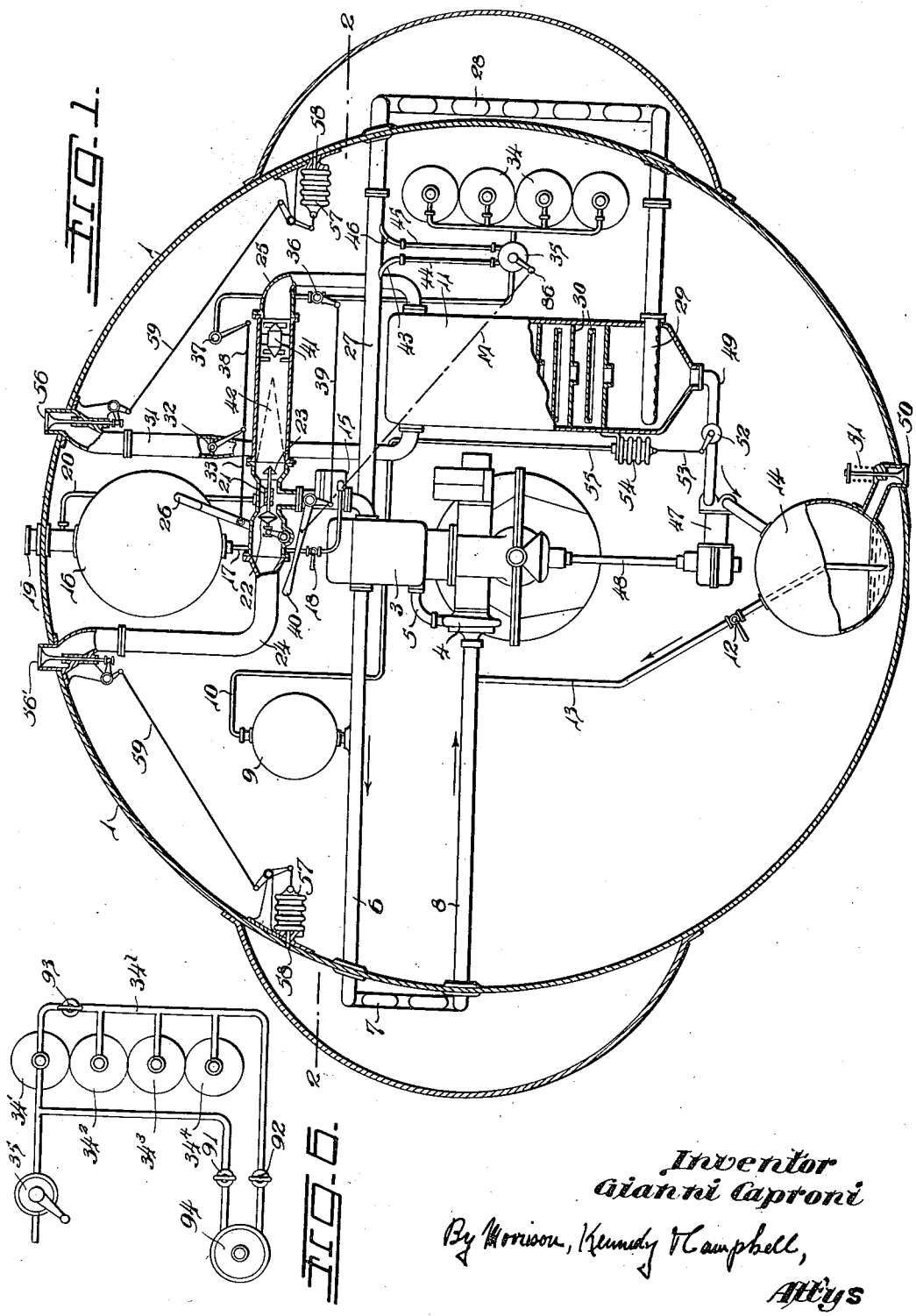
Figure 1 shows a cross section of the submarine showing diagrammatically the whole plant.

With reference to Fig. 1, 1 indicates the main skin or shell of the submarine, 2 being the normal water line of the emerged boat.

The engine is cooled by circulation of soft water actuated by the centrifugal pump 4. The water circuit consists of the tube 5, motor 3, tube 6, serpentine or cooling coil 7, which is continuously surrounded by cold water, and of tube 8. On the upper tube 6, the upper tank 9 is arranged in a way to maintain the charge, while the evaporation discharges through the tube 10 into the tank 11, later explained so as to wet not excessively the atmosphere of the submarine.

The supply of water to offset the evaporation is obtained by opening now and then the cock 12 inserted in the tube 13, which extends to the bottom of a lower tank 14 where, as will be explained, distilled water under pressure will be always stored.

The carburetor 15 is preferably of the so-called inverted vertical type to the end that any dribbling of petrol when running empty or during stopping will deposit in the engine itself instead of dropping into a place where it would cause danger of explosion. The carburetor could be fed with fuel by gravity or by means of a pump.

In the embodiment shown, the feeding takes place by descent from the tank 16 through the tube 17 provided with the cock 18; the carbureter as well as the said tank are hermetically tight, either to hinder the escape of fuel vapours and the dropping into the hold of the submarine, or to permit of varying automatically the feed pressure of the fuel in accordance with the variation of that of the burning medium: for this purpose, the tank is closed by the plug or cap 19, and the tube 20 brings it in constant communication with the feed conduit 21 of the burning medium, whether air or gas, while the carburetor, because of its construction, is internally in constant communication with the top of the constant level basin.

In the case of fuel supply by means of a pump, the tank may be arranged at the bottom, and the connection between pump, tank and carburetor may be afforded by systems as commonly in use for aircraft motors provided with compressor. A double valve commutating device 22—23, the normal rod of which slides, within a special guide, at the axis of the feed conduit 21, puts the carburetor in communication with the atmosphere through the pipe 24 or through the pipe 25 with the oxygenated gas, and this according to whether said rod stands in one or in the other of the terminal positions, that in Fig. 1 being considered the position for running with gas.

The double valve is controlled by hand through a lever 26 and combined with means which shall be explained hereafter, owing to which, under exclusion of any intermediate position, it will be possible to shift said lever only into one or the other of the extreme positions.

The discharge of the engine takes place through a pipe 27 and a serpentine coil 28; this coil being always completely surrounded by the external cold water so that the water vapour it contains will become wholly condensed by such intense cooling. At the outlet of the serpentine 28 a gas will be delivered which consists prevailingly of carbonic anhydride and condensation water containing a little carbonic anhydride in solution.

This mixture enters into the lower part of the tank 11 through the perforated pipe 29; the water deposits in the conic bottom of the tank 11, while the gas tends to rise subject to a series of throttlings and expansions in the labyrinth of diaphragms 30, which practically extinguish the pressure fluctuations of said gas in the manner of automobile silencers.

From the top of the tank 11 the cold gas can discharge into the atmosphere through the pipe 31 when the double valve 22—23 is in position to run with air (in which instance the flap valve 32 is open as well as the safety valve 56 which will be further explained), or the gas may flow towards the engine through the pipe 25 when the double valve 22—23 stands in the position to run with gas (in which case the valve 32 is closed and the safety valve 56 is open or closed in accordance with whether the submarine is afloat or immersed).

The flap valve 32 is connected, by means of the link or draw bar 33, with the same lever 26 which controls the double valve 22—23.

The gas coming out from the tank 11 and passing on to feed the engine, at its entrance into the pipe 25 mixes with the oxygen originating from the high pressure flask battery 34 and passing through a pressure reducer 35 regulated by initial setting, and the two cocks in series 36 and 37; the latter cock is governed by the same lever 26 which controls the double valve 22—23, namely, by means of the link or draw bar 38, so as to be opened or wholly closed, according to whether the engine is being run with gas or with air. The cock 36, on the other hand, by means of the link 39, is connected with the lever 40 which controls the throttle of the carburetor, so that the quantity of oxygen will vary in proportion to the quantity of gas consumed by the engine in order to obtain a burning medium which has the same content of oxygen at all ranges of the engine.

The mixing of the oxygen with the gas should be as homogeneous as possible; for this, a mixing device 41, hereinafter further described, is arranged in the pipe 25 at the entrance point of the oxygen; between the mixer 41 and the double valve 22—23, a metal mesh 42 is disposed to extinguish the back flow of flames coming from the carburettor.

The oxygen which is heavily cooled by its own expansion in the reducer 35, would cause the congelation of the reducer itself with the consequent stopping of the internal valves, and cause also an excessive cooling of the gas with the consequent condensation of the fuel. For avoiding this, the pressure reducer 35 is warmed by means of a diversion of the hot exhaust gas, formed by the dynamic connection 43, tubes 44, 45 and static connection 46, which diversion is made upon the conduit 27.

Of course, also a warming device of another type could be provided, for instance an electric one.

As the volume of water vapour drawn from the exhaust gas by way of condensation in the serpentine 28 is inferior to the volume of oxygen introduced, the oxygenated gas available for the engine would be in excess, and therefore a certain quantity must be removed preferably along with the condensation water. For this is provided a suction pressure pump 47 driven by the engine through the shaft 48. This pump is arranged below the lowest point of the tank 11 in order to suck out of the pipe 49, not only all the water which tends to deposit, but also the excess of gas, and to send this mixture of the tank 14 already mentioned.

This tank is provided with an automatic exhaust valve 50, normally held closed by a light spring 51 and by the external water pressure.

The said valve opens when the pressure in the tank 14 exceeds slightly the corresponding pressure at the shut-off of the outside water, thus making the mixture escape. As the gas consists prevailingly of carbonic anhydride it will be rather completely dissolved exteriorly while it ascends within the mass of external water.

The quantity of gas which in addition to the condensation water is removed by the cycle, should depend on or vary according to the speed of the engine so as to maintain the absolute feeding pressure of the burning medium constant, because properly on the basis of this constant pressure, the whole oxygen supply equipment has been arranged and adjusted. For such purpose it will not be sufficient that the pump and the engine rotate synchronously as the efficiency of these machines follows rules which are a little different, and also for other reasons among which is the variable intensity of cooling of the gas, according to the speed of the submarine. Therefore, in the suction piping 49 of the pump, a cock 52 is arranged which by means of a draw bar or link 53 is connected with a manometric capsule 54 of the bellows type, which through a pipe 55 communicates with the top of the tank 11 beyond the muffling action. When the pressure in said tank 11 tends to fall, the cock 52, correspondingly, tends to throttle the suction of the pump and vice versa.

The air feed tube 24 and as well the discharge tube 31 to the atmosphere, open towards outside of the boat, and this through the safety valves respectively 56' and 56. These latter are opened when the engine runs with air and the boat is emerged, while they will automatically shut when the boat begins the submerging manoeuvre (that is, after having changed-over to running with gas). This takes place in consequence of the external water pressure in two manometric bellows capsules 57 which are arranged slightly above or superior to the normal water line of the emerged boat, and communicate with the outside each through a hole 58.

On account of their own elasticity said capsules tend to maintain opened the valves, acting through links 59 and suitable levers action; but the water pressure tends to shut them when it has acquired the superiority, which will happen when the submerging manoeuvre is initiated.

The purpose of these safety valves (which could be also controlled by hand) is the following: As concerns the valve 56', it prevents during submersion the pipe 24 becoming filled with water, which would prevent the changing-over to running upon air with the subsequent emergence; as concerns the valve 56, instead, it prevents the outside water trickling through the valve 32 and entering the tank 11, which would greatly interfere with running with gas.

The operation is as follows: With stopping motor, the lever 40 will be always in the position of the closed carburetor so that the cock 36 for the oxygen, connected to it, will also be shut; the lever 26 will be in the position for running with air and, as a consequence, also the other cock 37 for the oxygen will be closed.

The starting and the running with air, therefore, take place only in surface running; the safety valves 56 and 56' are opened as also the valves 22 and 32, while the valve 23 is closed. In this condition the suction as well as the discharge take place liberally from and into the atmosphere. The gas discharge, instead, is through the serpentine 28 and the tank 11, so that, when the water vapour is condensed and the water, by means of the pump 47 is removed, the gas escapes in cold state and without pulsation, and thus without any noise.

The variations of the ranges are normal; operating the lever 40 of the carburetor, the cock 36 will take part idly with the motion of the lever 40 as the escape of the oxygen is prevented by the cock 37.

In order to change-over from running with air to that with gas, nothing is needed but, to bring the lever 26 rapidly into the opposed position, and this is so, whatever may be the range at which the engine is running with air. In fact, as the pressure of the oxygen has once for all been adjusted in the reducer 35, the cock 36 regulates its discharge in accordance with the range, on account of its being connected with the flap of the carburetor; the shifting of the lever 26 has shut the air suction valve 22, opened the gas inlet valve 23, closed the free escape valve 32, and opened the cock 37 of the oxygen.

The pump 47 continues as before to perform its work, and the capsule 54 regulates the suction of same, operating upon the cock 52 so as to maintain the feeding pressure in the tank 11 constant.

The starting with gas is also normal: it is sufficient to take care of this by regulating exactly by the link 39 so that the wholly shut carburetor will correspond to the total shutting of the cock 36, and moreover, preventing opening the carburetor together with said cock, when the engine is turning driven by its own little starting motor, by blocking the lever 40, in the case of vain attempt, before the engine stops. This is necessary to avoid an accumulation of oxygen in the pipe 25 and the tank 11, which would make impossible the starting by excessively meagre mixture.

It is important that all the conduits which the exhaust gas transverses before and after the oxygenation, the mobile members they contain, and the tank 14, must be of a non-oxidizable material. The rapid accumulation of rust would form crusts which would be swept away into the engine or the pump, thus damaging the one or the other.

Figure 2:
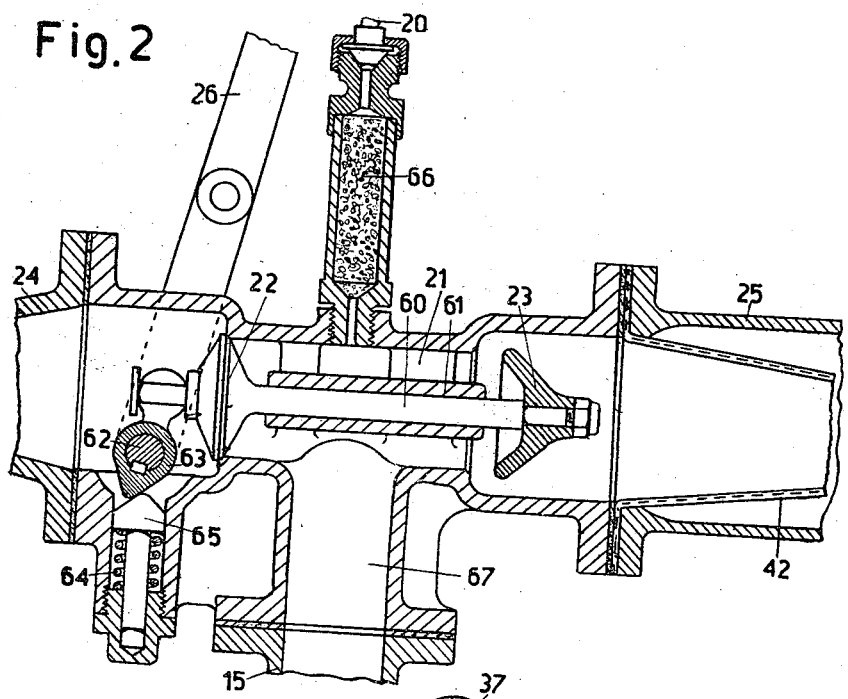
Fig. 2 shows particularly an axial section of the double valve changing-over device.

With reference to Fig. 2, which shows an embodiment of the double valve, also here the two interdependently controlled valves are indicated by 22 and 23; they are connected by the rod 60 which slides in the guide 61, and they put the carburetor 15 in communication with the air feed conduit 24 or with conduit 25 for charging by oxygenated gas. The external control hand lever 26 is keyed on the pivot 62, together with the internal fork 63, the hub of which constitutes a cam or tappet shaped as a pointed heart. Against this tappet, a wedge 65 of a pointed key shape is pressed by means of a spring 64. In this way, the double valve is obliged to displace into one or the other of the two extreme positions and to remain therein, without stopping in an intermediate position.

The valve 23 is concave towards the carburetor so as to give rise to the formation of whirls which favour a further mixing of the oxygenated gas coming from the pipe 25, and at the same time to prevent the antiflame mesh 42 being damaged by an accidental backfire of flames.

A chamber 66, containing high heat conducting metal chips, works as an antiflame guard ahead of the pipe 20.

Figure 3:
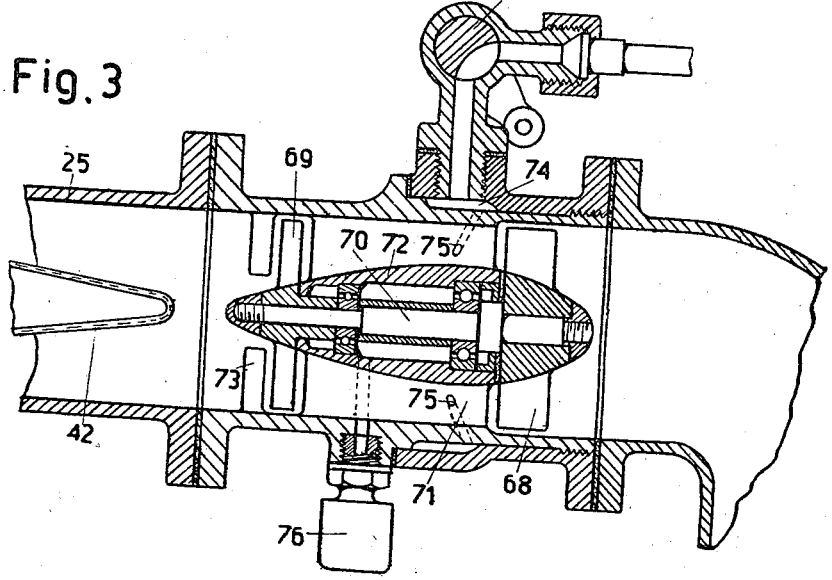
Fig. 3 shows in particular the mixing device.

Of a particular construction is the mixer shown in Fig. 3: two little (propeller) screws 68 and 69 are keyed on a common shaft 70 and placed respectively in front and behind the longitudinal radial ribs 71, which sustain the ball bearing 72; the first screw 68 is movable with respect to the second one and has, thus, all the characteristics for maximum efficiency or output (to give the maximum power while offering the minimum resistance to the passage of the gas); the second screw 69, driven by the first one, must, instead, create again the gas whirlings which break the continuity of the gas flow between the fixed ribs 71 and the annular ribs 73 also fixed, and so that said screw shall consume the minimum of power, it has very narrow blades. The oxygen which enters the annular chamber 74, coming from the cock 37, escapes through the little ho'es 75 aslantly bored into the ribs 71, and is energically mixed with the gas by the whirling motion created, as has been seen, by the screw 69. A grease cup 76 serves to lubricate the ball bearings.

In Fig. 1, the two safety valves 56—56' are shown, for better clearness in the drawings which are schematical, with the manometric capsules fixed directly at the skin of the submarine and connected with the valves, as by means of long slanting draw bars 59.

Fig. 4 shows a more practical and complete embodiment of the same idea. Each of the valves 56' and 56 has the stem jointed by pivot 77 to a vertical draw bar 78. The manometric bellows capsule 57 is mounted on the pipe 24 (or 31) and operates through the double joint 79 upon the draw bar 78 by the intermediate lever 80 which at 81 is pivoted to the said bar, and at 82 to the fixed support 83. The elasticity of the capsule tends to maintain the valve completely open until the joint 77 comes to stop against the guide of the rod, while a spring 84 counterpoises the weight of the mobile equipment and of the water contained in the capsule. The inner chamber of the capsule communicates with the water outside of the submarine through a small pipe 85 which opens near the normal water line 2, while the bottom of the capsule is located a little above said line (see distance X above water level). With the beginning of the submersion manoeuvre, when the water lever 2' reaches a certain height Y above the bottom of the capsule, the pressure of the water overcomes the elasticity of the capsule and the various frictions, and the capsule becomes longer thus closing the valve (for instance, with a level distance $Y=1m$ and an effective surface of the capsule of 50 cm$^2$ the pressure said surface provides is 5 kg.).

The mobile equipment may have also a control by hand, independent or connected with the mechanism which regulates the submersion, or with the lever 26 which alters the manner of feeding the engine.

In the foregoing description it has been stated that the oxygen reaches the mixer under constant pressure controlled by the reducer 35, and that the feed of oxygen is maintained in the right and constant proportion to that of the gas, by means of a cock 36 connected with the lever 40 of the throttle of the carburetor.

The same effect could be obtained by connection of the lever 40 with that 86 of the reducer and omitting or by-passing the cock 36, said connection being made so that a greater opening of the carburettor throttle corresponds to a higher pressure of the oxygen at the outlet of the reducer. In Fig. 1 the said connection is schematically indicated by the dotted line M. It is useful that in this case the reducer be brought into the close neighbourhood of the cock 37, for instance, at the place of the suppressed cock 36.

According to the preceding description, the elimination or exhaustion from tank 14 to outside of the boat is continuous beginning with the moment at which in the tank 14 a pressure is reached which is a little higher than that of the water outside.

Although the quantity of gas to be removed is small and the gas (which is composed prevailingly of carbonic anhydride) is dissolved in the mass of water which it is forced to pass in order to ascend to the surface, it would be also of value, be it even for a short time, to stop its discharge with a view to making the submarine path invisible through the elimination of bubbles. For this purpose, according to the modification of Fig. 5, the valve 50 has a spring 51a much stronger than that in the preceding instance, adjusted so that the valve will open automatically only when the pressure in the tank 14 reaches the limit of safety of the resistance of the tank itself; a hand lever 87, however, can open the valve at any moment desired. By this arrangement it is possible to anticipate and postpone at will the escape of the gas up to the resistance point and the limit of capacity of the tank, at which point the valve opens of itself.

The condensation water, instead, is discharged continuously and independently of the pressure of the gas by the control of a float 88 which opens the little valve 89 when the level of the water in the tank reaches a predetermined depth, at which it maintains itself constant.

The pressure of the oxygen at the outlet of the reducer is of principal importance for the regular working with gas; once regulated and set in right relation to the apertures of the throttle of the carburettor and the cock 36, it need no more be changed.

Now, it is known that with the most perfect pressure reducer, the pressure below or beyond the reducer begins to diminish when the pressure above in the flasks has gone down to about twenty atmospheres; from this moment, in order to prevent the mixture of the burning medium getting gradually sooty by oxygen, thus causing a gradually less perfect working of the engine, it would be necessary to regulate the reducer continuously by hand. But, yet, when the pressure in the flasks has gone down to about ten atmospheres, the proper working of the reducer would have become altogether impossible. And at this point there would be a rather substantial quantity of oxygen in the flasks that the engine could not make use of.

The embodiment according to Fig. 6 remedies this inconvenience.

The different flasks $34^1$, $34^2$, $34^3$, $34^4$, ..... are connected by a piping $34b$; a set of three cocks 91—92—93 is arranged to seclude the first bottle (which always is to feed directly the reducer 35) from all the others, and to set these for their part in communication with the first one through a compressor 94 driven by a motor.

Normally the cocks 91 and 92 are closed, while 93 is open and the compressor stands idle; in that case all the bottles feed the reducer 35.

When the pressure in the bottles is gone down to the critical one of, for instance, 20 atmospheres, the compressor is (again) set to work, 93 is shut while 91 and 92 are opened; the compressor makes all the oxygen contained in the other ones pass into the first bottle $34^1$ up to the complete emptying of the others even down to less than one absolute atmosphere. Now, the compressor can be stopped and valve 91 closed.

In this way, the stock of oxygen will be better utilized, although the compressor absorbs a certain power from the motor.

Of course, it will be convenient to carry out this operation, whenever possible, during the travel afloat, that is with the engine running with air.

In the case in which the plant comprises a combustion engine of the Diesel or similar type, the said installation in its whole may be the same as in the above instance, save for the following modifications:

The carburetor is omitted or replaced by a simple pipe which connects the upper passage or cross piece with the conduit of the engine; the feed of air or of gas does not require any regulation.

The accompanying fuel injection pump is of a common type preferably with a delivery variable according to the speed ranges; the lever 40, instead of controlling the throttle of the carburetor, governs the device for the variation of the injection, existing in the pump, said lever remaining connected with the cock 36 for the oxygen so as to maintain the right ratio of oxygen-fuel for the various ranges.

As the fuel is not volatile, the tank 16 may communicate with the atmosphere of the submarine. As a consequence, the pipe 20 may be omitted.

It is to be understood that in practice variations of construction and practical application can be made without departing from the principles of the invention or the intention of the claims.

Having now described my invention and practical ways in which it may be carried out, what I claim as my invention is:

1. In a submarine boat containing an internal combustion engine with supply and feed of liquid fuel thereto, a compressed oxygen supply with a regulable pressure reducer, and an engine cooling system with forced water circulation; the combination of a valved commutator delivering selectively either exterior air or gas-oxygen mixture to the engine and having first and second adjusted positions with a shifter or lever for reversing it, an air passage leading from a closable exterior inlet to the commutator to supply air thence to the engine in the first commutator position when running emerged, a gas-oxygen mixer having a passage leading therefrom to the commutator to supply such mixture thence to the engine in the second position when running submerged, an engine exhaust gas passage having a cooling section and a muffling section and leading thence to the mixer, with a branch passage leading to a closable exterior outlet to discharge gas when running emerged, and an oxygen passage leading from said pressure reducer to the mixer with a shut-off valve.

2. The combination as in claim 1 and wherein the engine comprises a sealed carbureter to which lead the fuel feed and the delivery of the commutator.

3. The combination as in claim 1 and wherein is a single controller or lever operable for shifting the commutator from first to second position for submergence and coordinately opening the oxygen shut-off valve, and vice versa.

4. The combination as in claim 1 and wherein is a single controller or lever operable for shifting the commutator from first to second position for submergence and coordinately opening the oxygen shut-off valve, and vice versa, and said exhaust branch passage having a shut-off valve, with a connection from said single controller operating to close the same when opening the oxygen valve.

5. The combination as in claim 1 and wherein the closable air inlet has a valve with self-acting means openable to close it when submerging.

6. The combination as in claim 1 and wherein the closable air inlet has a valve with self-acting means openable to close it when submerging, and the gas outlet has a similar valve with self-acting closing means.

7. The combination as in claim 1 and wherein the closable air inlet has a valve with self-acting means openable to close it when submerging, said means comprising a pressure responsive device or manometric capsule, with a passage communicating outside pressure thereto and located above the emerged waterline, thereby to be operated by submergence, and a connection or link from the device to the valve to close the valve.

8. The combination as in claim 1 and wherein the commutator comprises a housing or duct containing two valve seats, a movable valve stem carrying two valve disks, one for each seat, the shift lever connected to throw the stem and disks to their extreme positions thereby to close one and open the other valve, and a yieldable positioning device to hold the parts in one or the other of their extreme positions.

9. The combination as in claim 1 and wherein the commutator comprises a housing containing a double valve, means to throw the double valve reversely to its extreme positions; the fuel supply comprising a tank, a pipe leading from the top of the fuel tank toward the commutator, a chamber containing metal chips to which said pipe leads, and a downtake passage from the chamber to the commutator.

10. In a submarine boat containing an internal combustion engine with supply and feed of liquid fuel thereto, a compressed oxygen supply with a regulable pressure reducer, and an engine cooling system with forced water circulation; the combination of valve means delivering selectively either exterior air or gas-oxygen mixture to the engine and with means for reversing the delivery, a gas-oxygen mixer having a passage leading therefrom to supply such mixture to the engine when running submerged, an oxygen passage leading from said pressure reducer to the mixer, and an engine exhaust gas passage having a cooling section and a muffling section and leading thence to the mixer; said cooling section adapted by condensation to dehydrate the hot gas and deposit the condensate, and said muffling section conducting the gas through throttling and expansion operations, thereby to extinguish pressure fluctuations and furnish the dry gas with steady flow to the mixer.

11. The combination as in claim 10 and wherein is a collector into which the gas condensate drains, a passage leading from the collector to the engine cooling system and pumping means to force the flow of condensate in said passage.

12. In a submarine boat containing an internal combustion engine with supply and feed of liquid fuel thereto, a compressed oxygen supply with a regulable pressure reducer, and an engine cooling system; the combination of valve means delivering selectively either exterior air or gas-oxygen mixture to the engine, a gas-oxygen mixer having a passage leading therefrom to supply such mixture to the engine when running submerged, an oxygen passage leading from said pressure reducer to the mixer, an engine exhaust gas passage having a cooling section and a muffling section and leading thence to the mixer, said cooling section adapted by condensation to dehydrate the hot gas and cause deposit of condensate and said muffling section adapted to extinguish pressure fluctuations of the gas and supply it with steady flow to the mixer; a drain passage adapted to conduct such condensate and also some gas from the gas passage, and means operable to receive the condensate and some gas through said drain passage and conduct the same to a place of disposal, whereby the gas cycle may be relieved of excess of gas and pressure.

13. The combination as in claim 12 and wherein the last-named means is a pump means arranged to suck all condensate and a variable amount of gas from the gas passage and force the same through means adapted to final disposal as by discharging exteriorly.

14. The combination as in claim 12 and wherein the last-named means is a pump means arranged to suck all condensate and a variable amount of gas from the gas passage and force the same through means adapted to final disposal as by discharging exteriorly; and self-acting means for regulating said pump means in a manner to relieve gas at a variable rate to deliver beyond the muffling section a substantially steady pressure of gas coordinated with the pressure of oxygen to be mixed therewith.

15. The combination as in claim 12 and wherein the last-named means is a pump means arranged to suck all condensate and a variable amount of gas from the gas passage and force the same through means adapted to final disposal as by discharging exteriorly; and self-acting means for regulating said pump means in a manner to relieve gas at a variable rate to deliver beyond the muffling section a substantially steady pressure of gas, said self-acting means comprising a pressure-responsive device or capsule in communication with the gas passage at a point between the muffling action and the mixer and connected to vary the pumping action by increasing the action with increase of pressure and vice versa.

16. The combination as in claim 12 and wherein the last-named means is a pump means arranged to suck all condensate and a variable amount of gas from the gas passage and force the same through means adapted to final disposal as by discharging exteriorly; together with a valve controlling the flow through the drain passage to the pump, and a device responsive to the gas pressure after muffling to increase the opening of said valve with increased gas pressure and vice versa thereby to relieve excess gas and maintain substantially steady pressure of gas flow to the mixer.

17. In a submarine boat containing an internal combustion engine with supply and feed of liquid fuel thereto, a compressed oxygen supply with a regulable pressure reducer, and an engine cooling system; the combination of a gas-oxygen mixer having a passage leading therefrom to supply such mixture to the engine when running submerged, an oxygen passage leading from said pressure reducer to the mixer, an engine exhaust gas passage having a cooling section and a muffling section and leading to the mixer, said cooling section adapted for condensation to dehydrate the hot gas and cause deposit of condensate, a drain passage adapted to conduct such condensate and also some gas from the gas passage, a pressure tank, and a pump operable to suck the condensate and gas through said drain passage and force the same into said pressure tank.

18. The combination as in claim 17 and wherein is a self-opening discharge or safety valve delivering from said pressure tank to the exterior below water when the tank pressure reaches a predetermined pressure.

19. In a submarine boat containing an internal combustion engine with supply and feed of liquid fuel thereto, a compressed oxygen supply with a regulable pressure reducer, and an engine cooling system; the combination of a gas-oxygen mixer having a passage leading therefrom to supply such mixture to the engine when running submerged, an engine exhaust gas passage having a cooling section and a muffling section and leading thence to the mixer, and an oxygen passage leading from said pressure reducer to the mixer with a shut-off valve; said engine cooling system comprising a closed circuit for fresh water circulation with a pump forcing such circulation, a water reserve pressure tank, with a valved connection from its lower part to the water circuit, openable to make up water losses, a condensate drain passage leading downward from the gas passage beyond its cooling section, a pump to which said drain passage leads and adapted to pump the condensate and some gas from the gas passage to said pressure tank, thereby to make the condensate available for engine cooling and to maintain pressure in said tank.

20. The combination of claim 19 and wherein is means to regulate the pump operation to maintain steady pressure of gas flowing to the mixer, and valve means to relieve the pressure tank of excess liquid and gas by discharge, as exteriorly.

21. In a submarine boat containing an internal combustion engine with supply and feed of liquid fuel thereto, a compressed oxygen supply with a regulable pressure reducer, and an engine cooling system; the combination of a gas-oxygen mixer having a passage leading therefrom to supply such mixture to the engine when running submerged, an engine exhaust gas passage having a cooling section and a muffling section and leading thence to the mixer, and an oxygen passage leading from said pressure reducer to the mixer with a shut-off valve; said engine cooling system comprising a closed circuit for fresh water circulation with a pump forcing such circulation, a closed water reserve tank, with a valved connection to the water circuit, openable to make up water losses in said circuit, and means for forcing into said tank water of condensation from the gas passage and creating pressure in the tank.

22. The combination as in claim 17 and wherein is a self-opening safety valve set for high pressure, with a manual means to open it at will to relieve the pressure in the pressure tank and discharge exteriorly, also a water-discharging float-valve opened when the water in the tank rises above a predetermined depth above the tank bottom.

23. The combination as in claim 17 and wherein is a self-opening safety valve set for high pressure, with a manual means to open it at will to relieve the pressure in the pressure tank and discharge exteriorly, also a water-discharging float-valve opened when the water in the tank rises above a predetermined depth above the tank bottom; the safety valve receiving water and gas from a tank outlet somewhat above the tank bottom, and the float valve being set to discharge water rising above said outlet.

24. In a submarine boat containing an internal combustion engine with supply and feed of liquid fuel thereto, and a compressed oxygen supply; the combination of a gas-oxygen mixer having a passage leading therefrom to supply such mixture to the engine when running submerged, an engine exhaust gas passage having a gas conditioning section and leading to the mixer, a regulable pressure reducer for the oxygen supply, an oxygen passage leading from said pressure reducer to the mixer with a shut-off valve, and means for warming the reducer comprising a relatively small branch pipe diverting hot gas from the gas passage, flowing it in warming relation to the reducer and thence flowing it back to the gas passage.

25. In a submarine boat containing an internal combustion engine with supply and feed of liquid fuel thereto; the combination of a gas oxygen mixer having a passage leading therefrom to supply such mixture to the engine when running submerged, an engine exhaust gas passage having a gas conditioning section and leading to the mixer, a compressed oxygen supply, a regulable pressure reducer for the oxygen supply, and an oxygen passage leading from said pressure reducer to the mixer with a shut-off valve; said oxygen supply comprising a primary pressure flask communicating directly with the reducer, a series of supplemental flasks having a common manifold interconnecting them, a first pipe between said manifold and the primary flask and containing a cock whereby on depletion of pressure the cock may be closed to isolate the primary flask, a second pipe between said manifold and the primary flask, with an oxygen compressor therein operable when said cock is closed to force oxygen from the supplemental flasks to the primary flask thereby to deliver boosted pressure to the reducer.

26. In a submarine boat containing an internal combustion engine with a carbureter fed from a liquid fuel supply, a throttle lever, a compressed oxygen supply with a regulable pressure reducer, and an engine cooling system with forced water circulation; the combination of a gas-oxygen mixer having a passage leading therefrom to supply such mixture to the carbureter when running submerged, an engine exhaust gas passage having a gas-conditioning section and leading to the mixer, an oxygen passage leading from said pressure reducer to the mixer and having a regulating valve, and an operative connection between the carbureter throttle lever and said regulating valve to vary the oxygen pressure or flow to the mixer in accordance with the varying operation of the engine.

27. In a submarine boat containing an internal combustion engine with carbureter and supply and feed of liquid fuel thereto, and a compressed oxygen supply; the combination of a gas-oxygen mixer having a passage leading therefrom to supply such mixture to the carbureter in place of air when running submerged, an engine exhaust gas passage having a gas conditioning section and leading to the mixer, a regulable pressure reducer for the oxygen supply, an oxygen passage leading from said pressure reducer to the mixer with a shut-off valve, and an operating connection between the carbureter and reducer such that when the carbureter is throttled for reduced engine operation the reducer is further closed.

28. In a submarine boat containing an internal combustion engine with supply and feed of liquid fuel thereto, and a compressed oxygen supply; the combination of a gas-oxygen mixer having a passage leading therefrom to supply such mixture to the engine when running submerged, an engine exhaust gas passage having a gas conditioning section and leading to the mixer, and a regulable pressure reducer for the oxygen supply, with a valved passage leading from said reducer to the mixer; said mixer comprising a section of duct through which the gas stream flows and with means to introduce oxygen into the stream, a longitudinal interior shaft having a bearing supported from the duct wall, a first propeller or screw vane on said shaft rotated by the force of the entering gas stream, a second propeller on the shaft beyond the oxygen admission and driven by the rotation of the first propeller, to create turbulence in the mixture, and a baffle or rib beyond the second propeller.

29. In a submarine boat containing an internal combustion engine with supply and feed of liquid fuel thereto, and a compressed oxygen supply; the combination of a gas-oxygen mixer having a passage leading therefrom to supply such mixture to the engine when running submerged, an engine exhaust gas passage having a gas conditioning section and leading to the mixer, and a regulable pressure reducer for the oxygen supply, with a valved passage leading from said reducer to the mixer; said mixer comprising a section of duct through which the gas flows and admission of oxygen, a central longitudinal shaft having a bearing supported by a web extending from the duct waoll, a first propeller or screw vane on said shaft rotated by the force of the gas flowing into the duct, thereby to rotate the shaft, a second propeller on the shaft beyond the bearing web and oxygen apertures and of smaller effective area than the first propeller, and an annular baffle beyond the second propeller; the second propeller creating turbulence between it and said baffle for thorough mixing of gas and oxygen before passing to the engine.

GIANNI CAPRONI.

CERTIFICATE OF CORRECTION.

Patent No. 2,187,074. January 16, 1940.

GIANNI CAPRONI.

It is hereby certified that error appears in the printed specification of the above numbered patent requiring correction as follows: Page 7, second column, line 33, claim 29, after the word "and" insert with peripheral apertures for circumferential; line 36, same claim, for "waoll" read wall; and that the said Letters Patent should be read with this correction therein that the same may conform to the record of the case in the Patent Office.

Signed and sealed this 12th day of March, A. D. 1940.

Henry Van Arsdale,
Acting Commissioner of Patents.

(Seal)

CERTIFICATE OF CORRECTION.

Patent No. 2,187,074.

January 16, 1940.

GIANNI CAPRONI.

It is hereby certified that error appears in the printed specification of the above numbered patent requiring correction as follows: Page 7, second column, line 33, claim 29, after the word "and" insert with peripheral apertures for circumferential; line 36, same claim, for "waoll" read wall; and that the said Letters Patent should be read with this correction therein that the same may conform to the record of the case in the Patent Office.

Signed and sealed this 12th day of March, A. D. 1940.

Henry Van Arsdale,
Acting Commissioner of Patents.

(Seal)